UNITED STATES PATENT OFFICE.

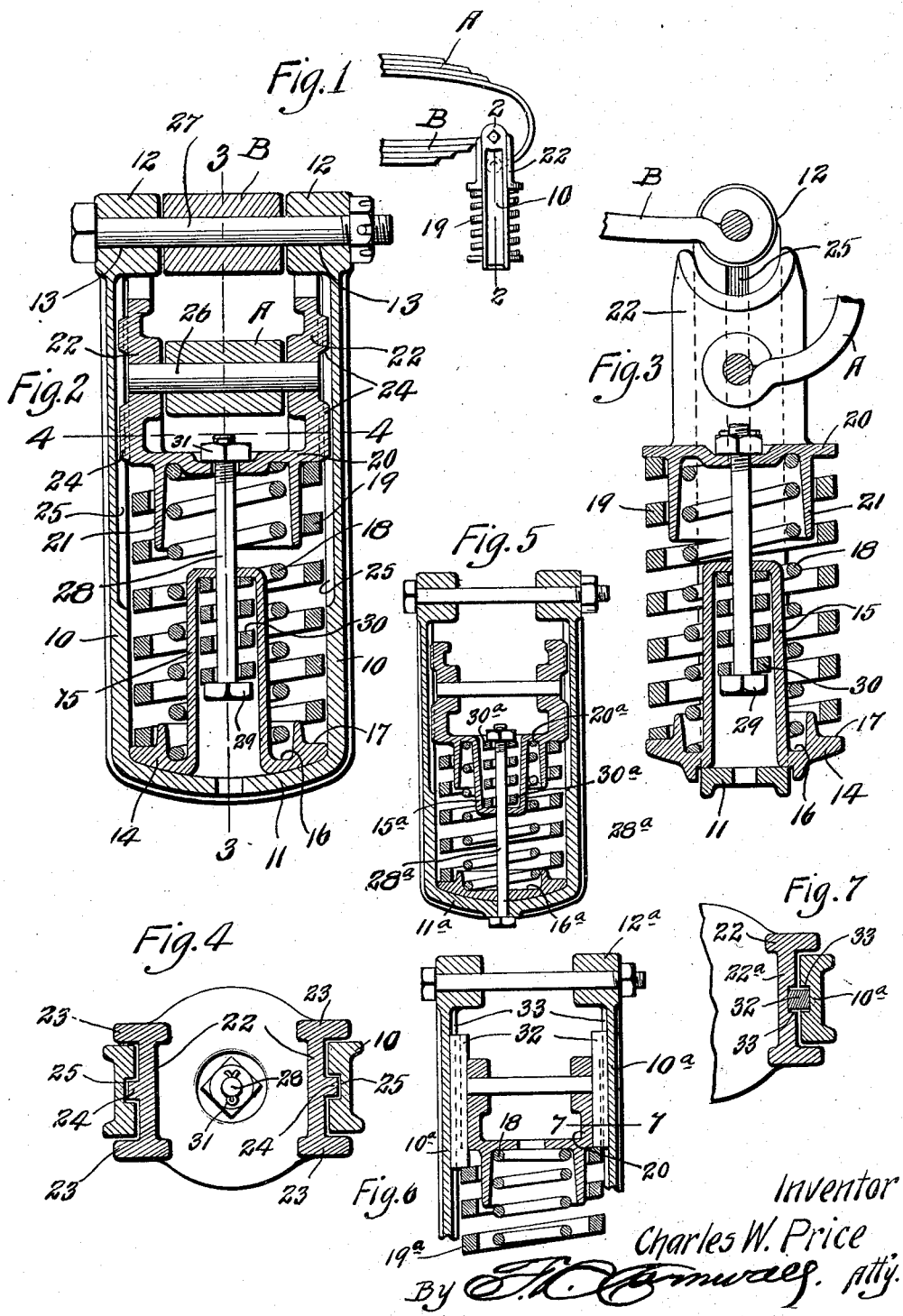

CHARLES W. PRICE, OF ST. LOUIS, MISSOURI.

SHOCK-ABSORBER.

1,200,022.  Specification of Letters Patent.  Patented Oct. 3, 1916.

Application filed July 12, 1915. Serial No. 39,309.

*To all whom it may concern:*

Be it known that I, CHARLES W. PRICE, a citizen of the United States, residing at St. Louis, Missouri, have invented a certain new and useful Improvement in Shock-Absorbers, of which the following is a full, clear, and exact description, such as will enable others skilled in the art to which it appertains to make and use the same, reference being had to the accompanying drawings, forming part of this specification.

My invention relates to a supplementary spring or shock absorber generally intended for use in connection with the elliptic springs of vehicles and particularly those which are motor driven, the construction herein illustrated and described being an improvement on the construction disclosed in my Patent No. 1,141,264, dated June 1, 1915.

The principal object of my present invention is to generally improve upon and simplify the construction of the device disclosed in my patent aforesaid, and to provide the shock absorber with an auxiliary or supplementary spring arranged so as to cushion and yieldingly resist the rebounding movement of the parts of the device which are connected to the elliptic springs of the vehicle after said parts have been actuated to compress the main springs of the device.

Further objects of my invention are to provide a comparatively simple and inexpensive shock absorber which will be readily responsive to all service shocks and stresses and which device comprises a minimum number of parts arranged and combined so as to afford the greatest degree of structural strength and at the same time facilitating assemblage and the removal or replacement of parts which may become worn or unfit for service.

With the foregoing and other objects in view, my invention consists in certain novel features of construction and arrangement of parts, hereinafter more fully described, claimed, and illustrated in the accompanying drawings, in which—

Figure 1 is a side elevational view of a shock absorber of my improved construction, the same being applied to a pair of semi-elliptical springs of the type usually employed on motor vehicles. Fig. 2 is an enlarged vertical section taken approximately on the line 2—2 of Fig. 1. Fig. 3 is a vertical section taken approximately on the line 3—3 of Fig. 2. Fig. 4 is a horizontal section taken approximately on the line 4—4 of Fig. 2. Fig. 5 is a vertical section taken through the center of a modified form of the device. Fig. 6 is a vertical section taken through the upper portion of a further modified form. Fig. 7 is a horizontal section taken approximately on the line 7—7 of Fig. 6.

As shown in the drawings, my improved device includes a substantially U-shaped yoke or stirrup, the same comprising a pair of parallel legs 10, the same being connected at their lower ends by a transversely disposed member 11 and provided at their upper ends with heads 12 through which are formed horizontally disposed apertures 13.

Removably seated on the transverse member 11 is a plate 14 which performs the functions of a seat for the lower ends of the main spiral springs forming a part of the device and formed integral with and projecting upwardly from the central portion of this plate is a cylindrical member 15 which serves as a housing for the auxiliary or rebound spring which is associated with the device.

Formed on top of the plate 14 between the housing 15 and the outer edge of said plate are concentric spring seats 16 and 17. Positioned on seat 16 is a comparatively light compression spring 18 and positioned on seat 17 is the lower end of a comparatively heavy compression spring 19. Supported by the upper ends of these springs is a plate 20 with which is formed integral a depending annular flange 21 which serves as a spacing member between the upper portions of springs 18 and 19 and formed integral with said plate is a pair of oppositely arranged upwardly projecting legs 22 which normally occupy positions between the upper portions of the legs 10. Formed integral with the sides of these legs 22 are outwardly projecting flanges 23 which overlie the side edges of the legs 10 and formed integral with and projecting outwardly from the central portions of said legs are lugs 24, which occupy vertically disposed grooves 25, the same being formed in the inner faces of legs 10. These flanges 23 and lugs 24 serve to guide the plate 20 in its vertical movement with respect to the legs 10.

Seated in the legs 22 are the ends of a transversely disposed pin 26, the same serving as a point of attachment for the end of one of the semi-elliptic vehicle springs A, the end of the other spring B being attached to a bolt or pin 27, which passes through the perforations 13 in heads 12.

Passing through an aperture in the center of plate 20 is a rod or bolt 28, the same extending through an aperture in the top of housing 15 and mounted on the lower portion of said bolt between a head or nut 29 on the lower end thereof and the top of housing 15 is a compression spring 30. A head or nut 31 is fixed to the upper end of this rod or bolt and bears directly on top of plate 20. This last mentioned spring 30 is for the purpose of cushioning the rebound or extreme upward movement of the plate 20 and parts carried thereby with respect to the yoke 10 and which rebounding movement follows the expanding movement of springs 18 and 19.

It will be noted that one of the vehicle springs is connected to sliding member comprising the plate 20 and legs 22 while the end of the other vehicle spring is connected to the upper end of yoke 10. By virtue of such construction the movement resulting from shocks imparted to either one of the vehicle springs will be transmitted to and absorbed by the compression springs 18 and 19, and during this action, the plate 20 and its legs will move downward between the legs of the yoke or vice versa, thus compressing the springs 18 and 19, and consequently absorbing the shocks and vibrations. Immediately after the compression of springs 18 and 19, plate 20 and its legs will be moved upward with a sharp or sudden rebound and in order to cushion this rebounding movement, I have provided the spring 30 which will be compressed by reason of the upward movement of bolt or rod 28, which latter is carried by plate 20.

In the modified construction illustrated in Fig. 5, the housing $15^a$ for the rebound spring $30^a$ is formed integral with and depends from the central portion of plate $20^a$, instead of being formed integral with lower plate $16^a$. In this modified construction, the pin or bolt $28^a$ extends downward through compression spring $30^a$ and through plate $16^a$ and lower transverse member $11^a$ of the yoke.

In the modified construction illustrated in Figs. 6 and 7, the rebound is adapted to be absorbed by spring $19^a$ through the medium of pins 32 which are positioned in coinciding grooves 33 formed in the adjacent faces of legs $10^a$ and 22, the lower ends of which pins normally rest on the upper coil of said spring $19^a$ and their upper ends being adapted to engage against heads $12^a$ which latter are formed on the upper ends of the legs $10^a$ of the yoke. In the event that the yoke in this construction is suddenly moved downward under the influence of spring B, the heads $12^a$ will strike against the upper ends of pins 32 and the downward movement of said pins will be yieldingly resisted by the compression spring $19^a$, and thus the heads $12^a$ on the upper ends of the legs of said yoke are prevented from striking with considerable force against the upper ends of the legs 22 of plate 20.

A device of my improved construction is comparatively simple, can be easily assembled or taken apart, is effective in absorbing shocks and vibrations which are ordinarily transmitted from one portion of a semi-elliptic vehicle spring to the other, and by providing the auxiliary spring 30 all shocks incident to the rebound of one part of the device to the other are absorbed and eliminated.

It will be readily understood that minor changes in the size, form and construction of the various parts of my improved device can be made and substituted for those herein shown and described, without departing from the spirit of my invention, the scope of which is set forth in the appended claim.

I claim:

In a device of the class described, a substantially U-shaped hanger provided in the inner faces of its legs with vertically disposed grooves, a member arranged for sliding movement between the upper portions of the legs of said hanger, vertically disposed ribs on said sliding member, which ribs engage in the grooves in the legs of the hanger, pairs of ribs arranged on the sides of said sliding member, which pairs of ribs engage the side edges of the legs of the hanger, a plate removably positioned on the lower end of the hanger, which plate is provided with a plurality of spring seats, a tubular housing extending upwardly from the center of said plate, compression springs positioned on the spring seats of said last mentioned plate, the upper ends of which springs bear against the underside of the sliding member, a bolt passing through the lower portion of said sliding member and the upper portion of the tubular housing, and a compression spring positioned upon said bolt within the housing.

In testimony whereof I hereunto affix my signature in the presence of two witnesses, this 6th day of July, 1915.

CHARLES W. PRICE.

Witnesses:
   Louis S. Abel,
   M. P. Smith.